United States Patent [19]

Marcerou et al.

[11] Patent Number: 5,561,553
[45] Date of Patent: Oct. 1, 1996

[54] SYSTEM FOR TRANSMISSION OVER A REPEATERLESS OPTICAL FIBER LINE, WITH REMOTE AND LOCAL AMPLIFICATION

[75] Inventors: Jean-Francois Marcerou, Courcouronnes; Jean-Pierre Blondel, Viroflay; Paul Gabla, Antony, all of France

[73] Assignee: Alcatel Submarcom, Clichy Cedex, France

[21] Appl. No.: 489,768

[22] Filed: Jun. 13, 1995

[30]   Foreign Application Priority Data

Jun. 14, 1994 [FR] France .................................. 94 07263

[51] Int. Cl.$^6$ .......................................................... H01S 3/00
[52] U.S. Cl. ........................................... 359/341; 359/160
[58] Field of Search ..................................... 359/160, 189, 359/341

[56]               References Cited

U.S. PATENT DOCUMENTS

| | | | |
|---|---|---|---|
| 5,185,814 | 2/1993 | Healey | 385/24 |
| 5,295,013 | 3/1994 | Ono | 359/192 |
| 5,392,153 | 2/1995 | Delavaux | 359/341 |

FOREIGN PATENT DOCUMENTS 2253514   9/1992   United Kingdom .

OTHER PUBLICATIONS

*Electronics Letters,* vol. 27, No. 17, 15 Aug. 1991, Stevenage GB, pp. 1537–1538, T. Ramussen et al, "Transmission Length Improvement in 2.5 Gbit/s Direct Detection System with Er–doped Fibre Amplifiers by Efficient Remote Pumping".

*IEEE Photonics Technology Letters,* vol. 2, No. 4, Apr. 1990, New York US, pp. 277–278, N. Hemi et al, "Rayleigh Scattering Influence on Performance of 10 Gbit/s Optical Receiver with Er–Doped Optical Fiber Preamplifier".

*Supercomm/International Conference on Communications, ICC '92,* vol. 2, No. 326, 14 Jun. 1992, Chicago, Illinois, US, pp. 748–754, A. F. Mitchell et al, "Considerations on High Speed Transmission".

*Primary Examiner*—Mark Hellner
*Attorney, Agent, or Firm*—Sughrue, Mion, Zinn, Macpeak & Seas

[57] ABSTRACT

A system for transmission over a repeaterless optical fiber line between an emitter and a receiver terminal, the system being of the type implementing remote optical amplification and local optical amplification on reception. The remote optical amplification consists in sending a pump beam from the receiver terminal towards at least one remote section of doped fiber situated upstream in said optical fiber line, said receiver terminal including, in particular, pumping means enabling said pump beam to be generated and enabling it to be injected into said optical fiber line. The terminal also includes means for performing said local optical amplification. According to the invention, said means for implementing local optical amplification are constituted by at least one local section of doped fiber situated within said receiver terminal between said pumping means and said optical fiber line.

3 Claims, 1 Drawing Sheet

SYSTEM FOR TRANSMISSION OVER A REPEATERLESS OPTICAL FIBER LINE, WITH REMOTE AND LOCAL AMPLIFICATION

The field of the invention is that of data transmission by optical fiber.

More precisely, the invention relates to a transmission system between an emitter and a receiver terminal, by means of a repeaterless optical fiber line.

BACKGROUND OF THE INVENTION

The main advantage of repeaterless transmission systems lies in the absence of electrically-powered elements in-line, thereby making such systems very reliable.

In order to increase the range of such systems, i.e. to increase the length of the transmission line, a known solution consists in using remote optical amplification. This is done by sending a beam of light known as the pump beam (e.g. at 1.48μm) from the receiver terminal towards a section of doped fiber (e.g. using erbium) that is situated several tens of kilometers upstream along the transmission line. The pump beam activates the section of doped fiber which then amplifies the signal conveying the data, thus enabling it to reach the receiver terminal at a level that is sufficient.

To implement such remote optical amplification, the receiver terminal includes a pumping module which comprises a pump beam source and a wavelength multiplexer enabling the pump beam to be injected into the transmission line.

An improvement to that known solution consists in combining said remote optical amplification (or remote amplification) with local optical amplification (in the receiver terminal). This additional optical amplification makes it possible to increase the length of line separating the remote section of doped fiber from the receiver terminal, and thereby to increase the range of the link.

Generally, the increase in the optical power budget is about 2.5 dB over the basic configuration (i.e. when there is no local optical amplification in the receiver terminal), thereby making it possible to increase the range of the link.

Known systems implementing such remote optical amplification are described, in particular, in the following articles:

401 km, 622 Mbit/s and 357 km, 2.488 *Gb/s IM/DD repeaterless transmission experiments using erbium-doped fiber amplifiers and error correcting code*, by P. M. Gabla, J. L. Pamart, R. Uhel, E. Leclerc, J. O. Frorud, F. X. Ollivier, and S. Borderieux, published in Photonics Technology Letters, Vol. 4, No. 10, October 1992; and

*Performance improvement of direct detection systems using local and/or long distance pumped fiber amplifiers*, by A. Bjarklev, J. H. Polvsen, K. Rottwitt, O. Lumholt, T. Rasmussen, published in Fiber and Integrated Optics, Vol. 10, pp. 215–223, 1991.

In those known systems, the (local) additional optical amplification is obtained using an additional optical amplifier placed downstream from the remote pumping module. A major drawback of the additional optical amplifier is that, of itself, it constitutes equipment that makes the receiver terminal more complex, and thus less reliable and more expensive.

OBJECTS AND SUMMARY OF THE INVENTION

A particular object of the invention is to mitigate this major drawback in the state of the art.

More precisely, one of the objects of the present invention is to provide a repeaterless optical fiber line transmission system of the type implementing remote optical amplification and (local) additional optical amplification, with the implementation of the additional optical amplification being cheap and easy to implement.

Another object of the invention is to provide such a system in which implementing additional optical amplification does not require any additional active element to be included.

According to the invention, these objects and others that appear below, are achieved by means of a system for transmission over a repeaterless optical fiber line between an emitter and a receiver terminal, the system being of the type implementing remote optical amplification and local optical amplification on reception, said remote optical amplification consisting in sending a pump beam from the receiver terminal towards at least one remote section of doped fiber situated upstream in said optical fiber line, said receiver terminal including, in particular, pumping means enabling said pump beam to be generated and enabling it to be injected into said optical fiber line, and means for performing said local optical amplification; said means for implementing local optical amplification being constituted by at least one local section of doped fiber situated within said receiver terminal between said pumping means and said optical fiber line.

The invention is thus based on implementing local (or additional) optical amplification by means of a section of doped fiber instead of by using an additional optical amplifier (placed downstream from the pumping means) as is the case in systems known in the state of the art.

Since the local section of doped fiber is situated between the pumping means and the optical fiber line, the pump beam (which is very powerful at this point) also activates the local section of doped fiber which therefore provides sufficient amplification with a very low noise level. The pump beam is attenuated little by passing through the local doped fiber (about 0.5 dB of attenuation) and its power remains sufficient for activating the remote doped fiber. In other words, the pump beam generated by the pumping means serves to activate both the remote section of doped optical fiber and the local section of doped optical fiber.

Implementing the additional optical amplification therefore requires only the addition of the local section of doped fiber, and thus it requires no additional active element. Its cost is therefore small and it is easy to implement.

Advantageously, said local section of doped fiber is doped with erbium.

Preferably, said means for performing local optical amplification and the pumping means constitute a single physical module of the receiver terminal.

That amounts to placing the means for performing local optical amplification in the pumping means. Thus, local optical amplification does not require separate equipment within the receiver terminal.

BRIEF DESCRIPTION OF THE DRAWING

Other characteristics and advantages of the invention appear on reading the following description of a preferred embodiment of the invention, given by way of non-limiting and indicative example, and with reference to the accompanying drawing, in which.

MORE DETAILED DESCRIPTION

Figure 1:
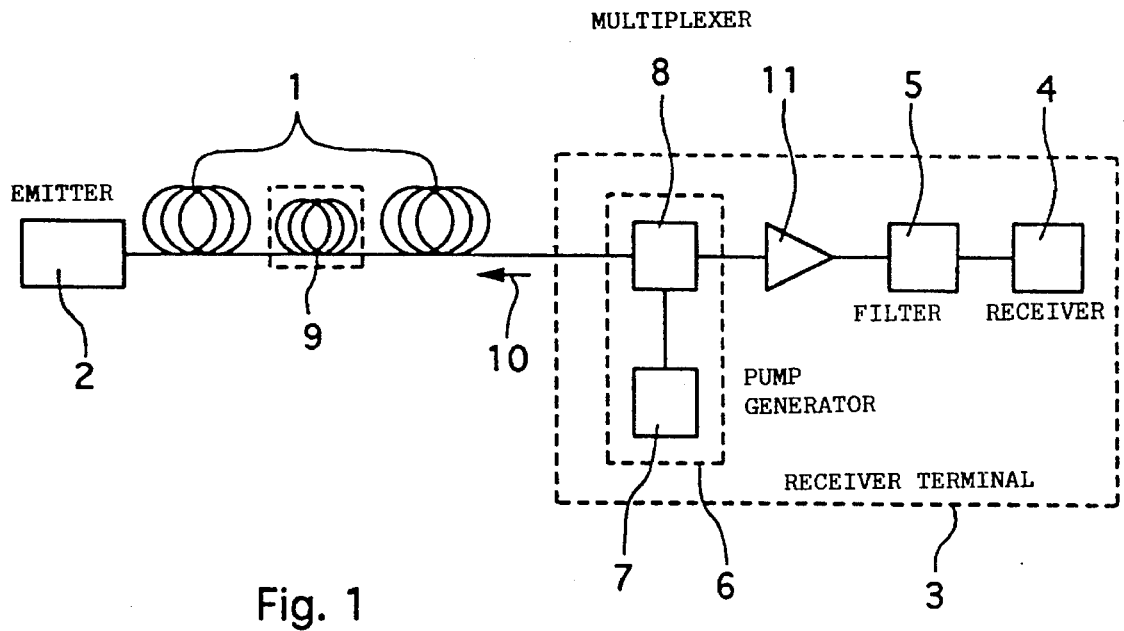
FIG. 1 is a simplified diagram of a transmission system known in the state of the art.

The system known in the state of the art (FIG. 1) and the system of the invention (FIG. 2) each comprise an optical fiber line 1 enabling an emitter 2 to be connected to a receiver terminal 3, 3'. The optical fiber line 1 is repeaterless. The receiver terminal 3, 3' includes, in particular, a receiver 4 preceded by a filter 5.

Both of these systems (FIGS. 1 and 2) make use of amplification by remote pumping.

The receiver terminal 3, 3' comprises, for this purpose, a pumping module 6 constituted by a pump 7 enabling a pump beam to be generated and by a wavelength multiplexer 8 enabling the pump beam to be injected into the optical fiber line 1.

Upstream in the optical fiber line 1, the system includes a section of doped fiber 9 (e.g. erbium-doped) that is remote from the receiver terminals 3, 3' by several tens of kilometers. The pump beam 1 activates this section of doped fiber which then amplifies the data signal, thereby enabling it to reach the receiver terminal 3, 3' at a sufficient level.

Both systems (FIGS. 1 and 2) also make use of additional amplification within the receiver terminals 3, 3'. This makes it possible to have the remote section of doped fiber 9 further away and thus to increase the range of the link.

In the system known in the state of the art (FIG. 1), the additional amplification is obtained by means of an additional optical amplifier 11 placed in the receiver terminal 3 between the pumping module 6 and the filter 5. This additional optical amplifier 11, of itself constitutes one of the physical pieces of equipment in the receiver terminal 3.

In the system of the invention (FIG. 2), the additional amplification is obtained with a section of doped fiber 12 (e.g. erbium-doped) placed in the receiver terminal 3', between the optical fiber line 1 and the pumping module 6.

This technique does not give rise to any constraint on the type of connector (not shown) that may be used at the inlet to the receiver terminal 3'. Thus, for example, it is possible to use a very common connector of the FcPc type (having its interface perpendicular to the optical transmission axis), without degrading transmission quality. In other words, the combination of the gain from the local section of doped fiber 12 (12 dB) and the reflections due to the inlet connector and to the fiber line 1 is not penalizing.

Figure 2:
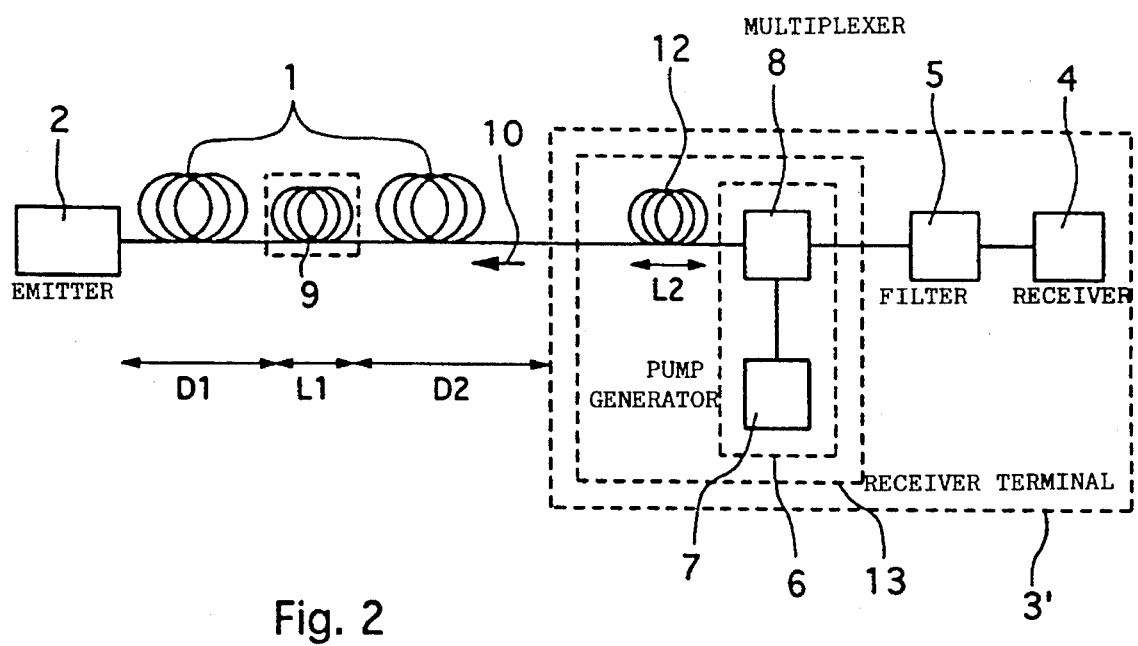
FIG. 2 is a simplified diagram of a transmission system of the invention.

In the example shown in FIG. 2, the local section of doped optical fiber 12 and the pumping module 6 constitute a single physical module 13.

The local section of doped fiber 12 is activated by the same pump beam 10 as serves to activate the remote section of doped fiber 9. In other words, the same pump 7 and the same multiplexer 8 can be used both for the remote amplification and for the local amplification within the receiver terminal 3'.

Generally, an isolator (not shown) is placed between the remote section of doped fiber 9 and the fiber line 1 situated upstream therefrom. Similarly, an isolator (not shown) is placed between the multiplexer 8 and the filter 5.

The description below relates to an experiment on the system of the invention in the special case of transmission having the following characteristics:

bit rate 622 Mbit/s;

distance along the optical fiber line 1 between the emitter 2 and the remote section of doped fiber 9, D1=200 km;

distance along the optical fiber line 1 between the receiver terminal 3' and the remote section of doped fiber 9, D2=38 km;

pump power injected into the optical fiber line 1 from the receiver terminal 3', P =50 mW at 1.48 μm;

length of the remote section of doped fiber 9 possessing erbium ions at a concentration of about 100 ppm, L1=25 meters (m); and length of the local section of doped fiber 12 possessing erbium ions at a concentration of about 100 ppm, L2=10 m.

The pump power received by the remote section of doped fiber 9 is about 7 mW and the gain in said remote section of doped fiber 9 is 20 dB. The gain in the local section of doped fiber 12 is 12 dB.

At the inlet to the remote section of doped fiber 9, the optical power (known as the detection threshold) required for obtaining a transmission binary error rate equal to $10^{-9}$ is −45.5 dBm.

Without using the technique of remote optical amplification, the detection threshold at the inlet to the receiver is −42 dBm, giving a difference of 3.5 dB.

With remote optical amplification and local optical amplification obtained using a local section of doped fiber 12 (in accordance with the invention), the increase in optical power budget is equal to the improvement in detection threshold (3.5 dB) plus the losses in the 38 km of fiber (7.3 dB), giving a total of 10.8 dB.

With remote optical amplification and local optical amplification obtained using an additional optical amplifier 11 (in accordance with the prior art), the increase in the optical power budget is equal to 11.3 dB (instead of 10.8 dB with the invention). It should be observed that this difference of 0.5 dB is due to the attenuation of the pump beam 10 in the local section of doped fiber 12.

This example shows that using an additional optical amplifier 11 provides only a small improvement in the optical budget (+0.5 dB) over the newly proposed solution (FIG. 2). In general, this small difference does not justify the additional cost and complexity caused by using an additional optical amplifier.

We claim:

1. A system for transmission over a repeaterless optical fiber line between an emitter and a receiver terminal, the system being of the type implementing remote optical amplification and local optical amplification on reception, said remote optical amplification consisting in sending a pump beam from the receiver terminal towards at least one remote section of doped fiber situated upstream in said optical fiber line, said receiver terminal including, in particular: pumping means enabling said pump beam to be generated and enabling it to be injected into said optical fiber line; and means for performing said local optical amplification; wherein said means for implementing local optical amplification are constituted by at least one local section of doped fiber situated within said receiver terminal between said pumping means and said optical fiber line, and consuming a minor part of the energy of said pump beam.

2. A system according to claim 1, wherein said local section of doped fiber is doped with erbium.

3. A system according to claim 1, wherein said means for implementing local optical amplification and the pumping means are constituted by a single physical module of the receiver terminal.

* * * * *